US009034295B2

(12) United States Patent
Harrison

(10) Patent No.: US 9,034,295 B2
(45) Date of Patent: May 19, 2015

(54) PREPARATION OF LITHIUM CARBONATE FROM LITHIUM CHLORIDE CONTAINING BRINES

(71) Applicant: Simbol Inc., Pleasanton, CA (US)

(72) Inventor: Stephen Harrison, Benicia, CA (US)

(73) Assignee: Simbol, Inc., Pleasanton, CA (US)

( * ) Notice: Subject to any disclaimer, the term of this patent is extended or adjusted under 35 U.S.C. 154(b) by 0 days.

(21) Appl. No.: 14/257,369

(22) Filed: Apr. 21, 2014

(65) Prior Publication Data

US 2014/0227154 A1 Aug. 14, 2014

Related U.S. Application Data

(63) Continuation of application No. 12/766,589, filed on Apr. 23, 2010, now Pat. No. 8,741,256.

(60) Provisional application No. 61/172,540, filed on Apr. 24, 2009.

(51) Int. Cl.
*C22B 26/12* (2006.01)
*C01D 7/00* (2006.01)

(52) U.S. Cl.
CPC .. *C22B 26/12* (2013.01); *C01D 7/00* (2013.01)

(58) Field of Classification Search
CPC .................................. C01D 7/00; C22B 26/12
USPC .................................................. 423/421, 427
See application file for complete search history.

(56) References Cited

U.S. PATENT DOCUMENTS

| 2,964,381 | A | 12/1960 | Goodenough |
| 3,306,700 | A | 2/1967 | Neipert |
| 3,321,268 | A | 5/1967 | Copson et al. |
| 3,523,751 | A | 8/1970 | Burkert et al. |
| 4,016,075 | A | 4/1977 | Wilkins |
| 4,036,713 | A | 7/1977 | Brown |
| 4,116,856 | A | 9/1978 | Lee |
| 4,116,858 | A | 9/1978 | Lee |
| 4,142,950 | A | 3/1979 | Creamer et al. |
| 4,159,311 | A | 6/1979 | Lee |
| 4,209,369 | A | 6/1980 | Seko et al. |
| 4,221,767 | A | 9/1980 | Lee |
| 4,251,338 | A | 2/1981 | Retallack |
| 4,276,180 | A | 6/1981 | Matson |
| 4,291,001 | A | 9/1981 | Repsher |

(Continued)

FOREIGN PATENT DOCUMENTS

| BE | 861527 | 12/1977 |
| CN | 1558793 | 12/2004 |

(Continued)

OTHER PUBLICATIONS

Extended European Search Report, Aug. 14, 2013.

(Continued)

*Primary Examiner* — Richard M Rump
(74) *Attorney, Agent, or Firm* — Fish & Tsang, LLP

(57) ABSTRACT

This invention relates to a method for the preparation of lithium carbonate from lithium chloride containing brines. The method can include a silica removal step, capturing lithium chloride, recovering lithium chloride, supplying lithium chloride to an electrochemical cell and producing lithium hydroxide, contacting the lithium hydroxide with carbon dioxide to produce lithium carbonate.

6 Claims, 7 Drawing Sheets

(56) References Cited

U.S. PATENT DOCUMENTS

| | | |
|---|---|---|
| 4,347,327 A | 8/1982 | Lee |
| 4,348,295 A | 9/1982 | Burba |
| 4,348,296 A | 9/1982 | Bauman |
| 4,348,297 A | 9/1982 | Bauman |
| 4,376,100 A | 3/1983 | Lee |
| 4,381,349 A | 4/1983 | Lee |
| 4,405,463 A | 9/1983 | Jost |
| 4,405,595 A | 9/1983 | Yang |
| 4,430,311 A | 2/1984 | Lee |
| 4,461,714 A | 7/1984 | Burba |
| 4,472,362 A | 9/1984 | Burba |
| 4,477,367 A | 10/1984 | Burba |
| 4,540,509 A | 9/1985 | Burba |
| 4,727,167 A | 2/1988 | Burba |
| 4,745,977 A | 5/1988 | Love |
| 4,762,656 A | 8/1988 | Ballard |
| 5,015,541 A | 5/1991 | Evans |
| 5,135,652 A | 8/1992 | Boateng |
| 5,145,656 A | 9/1992 | Gallup |
| 5,200,165 A | 4/1993 | Harper |
| 5,219,550 A | 6/1993 | Brown et al. |
| 5,229,003 A | 7/1993 | Duyvesteyn |
| 5,244,491 A | 9/1993 | Brown |
| 5,246,684 A | 9/1993 | Brown |
| 5,254,225 A | 10/1993 | Gallup |
| 5,358,700 A | 10/1994 | Brown |
| 5,389,349 A | 2/1995 | Bauman |
| 5,427,691 A | 6/1995 | Kuyucak |
| 5,441,712 A | 8/1995 | Duyvesteyn |
| 5,594,923 A | 1/1997 | Inoue |
| 5,599,516 A | 2/1997 | Bauman |
| 5,656,172 A | 8/1997 | Kitz |
| 5,711,019 A | 1/1998 | Tomczuk |
| 5,833,844 A | 11/1998 | Leavitt |
| 5,904,653 A | 5/1999 | Hatfield |
| 5,919,287 A | 7/1999 | Moreau |
| 5,932,644 A | 8/1999 | Fujii |
| 5,935,541 A | 8/1999 | Bonnet |
| 5,939,043 A | 8/1999 | Yahagi |
| 5,951,843 A | 9/1999 | Itoh et al. |
| 5,993,759 A | 11/1999 | Wilkomirsky |
| 5,997,836 A | 12/1999 | Sato |
| 6,017,500 A | 1/2000 | Mehta |
| 6,048,507 A | 4/2000 | Amouzegar |
| 6,080,696 A | 6/2000 | Duke |
| 6,103,422 A | 8/2000 | Kanai |
| 6,139,498 A | 10/2000 | Katsman |
| 6,170,037 B1 | 1/2001 | Blumenau |
| 6,207,126 B1 | 3/2001 | Bortya |
| 6,219,311 B1 | 4/2001 | Mitsuno |
| 6,280,693 B1 | 8/2001 | Bauman |
| 6,458,184 B2 | 10/2002 | Featherstone |
| 6,555,078 B1 | 4/2003 | Mehta |
| 6,592,832 B1 | 7/2003 | Friedrich |
| 6,682,644 B2 | 1/2004 | Featherstone |
| 6,770,187 B1 | 8/2004 | Putter |
| 7,026,072 B2 | 4/2006 | Barker |
| 7,060,238 B2 | 6/2006 | Saidi |
| 7,330,914 B2 | 2/2008 | Inogai |
| 7,390,466 B2 | 6/2008 | Bortya |
| 7,504,036 B2 | 3/2009 | Gottlieb |
| 7,678,470 B2 | 3/2010 | Yoon |
| 7,708,972 B2 | 5/2010 | Coustry et al. |
| 7,824,766 B2 | 11/2010 | Eplee |
| 8,197,707 B2 | 6/2012 | Lefenfeld |
| 8,287,829 B2 | 10/2012 | Harrison |
| 8,309,043 B2 | 11/2012 | Alurralde |
| 8,435,468 B2 | 5/2013 | Harrison |
| 8,454,816 B1 | 6/2013 | Harrison |
| 8,518,232 B1 | 8/2013 | Harrison |
| 8,574,519 B2 | 11/2013 | Harrison |
| 2001/0000597 A1 | 5/2001 | Featherstone |
| 2001/0028871 A1 | 10/2001 | Harrison et al. |
| 2002/0018929 A1 | 2/2002 | Dai et al. |
| 2003/0226761 A1 | 12/2003 | Featherstone et al. |
| 2003/0228251 A1 | 12/2003 | Boryta et al. |
| 2004/0005267 A1 | 1/2004 | Boryta et al. |
| 2004/0018135 A1 | 1/2004 | Adamson et al. |
| 2004/0142485 A1 | 7/2004 | Flower et al. |
| 2004/0149590 A1 | 8/2004 | Featherstone et al. |
| 2004/0264338 A1 | 12/2004 | Chou |
| 2005/0011753 A1 | 1/2005 | Jackson et al. |
| 2005/0162990 A1 | 7/2005 | Murata |
| 2005/0227147 A1 | 10/2005 | Kogetsy |
| 2005/0265909 A1 | 12/2005 | Kajiya et al. |
| 2006/0093911 A1 | 5/2006 | Chiga et al. |
| 2006/0115396 A1 | 6/2006 | Boryta et al. |
| 2006/0115407 A1 | 6/2006 | Boryta et al. |
| 2006/0115410 A1 | 6/2006 | Boryta et al. |
| 2007/0114134 A1 | 5/2007 | Legg et al. |
| 2007/0148077 A1 | 6/2007 | Boryta et al. |
| 2007/0160516 A1 | 7/2007 | Boryta et al. |
| 2008/0068963 A1 | 3/2008 | Shikata |
| 2008/0221440 A1 | 9/2008 | Iddan et al. |
| 2008/0233042 A1 | 9/2008 | Bortya et al. |
| 2008/0249395 A1 | 10/2008 | Shachar et al. |
| 2008/0300589 A1 | 12/2008 | Paul et al. |
| 2009/0107230 A1 | 4/2009 | Okcay et al. |
| 2009/0214414 A1 | 8/2009 | Boryta et al. |
| 2009/0264777 A1 | 10/2009 | Markowitz et al. |
| 2009/0275827 A1 | 11/2009 | Aiken et al. |
| 2010/0000597 A1 | 1/2010 | Cousins |
| 2010/0099991 A1 | 4/2010 | Snyder |
| 2010/0165672 A1 | 7/2010 | Li et al. |
| 2010/0172554 A1 | 7/2010 | Kassab et al. |
| 2010/0221613 A1 | 9/2010 | Ueki |
| 2010/0301267 A1 | 12/2010 | Mao et al. |
| 2010/0312095 A1 | 12/2010 | Jenkins et al. |
| 2010/0312096 A1 | 12/2010 | Guttman et al. |
| 2010/0327223 A1 | 12/2010 | Zaghib et al. |
| 2011/0044882 A1* | 2/2011 | Buckley et al. ............ 423/481 |
| 2011/0123427 A1 | 5/2011 | Boryta et al. |
| 2011/0142316 A1 | 6/2011 | Wang et al. |
| 2011/0200508 A1 | 8/2011 | Harrison et al. |
| 2011/0224655 A1 | 9/2011 | Asirvatham |
| 2011/0230896 A1 | 9/2011 | Wallace |
| 2011/0319765 A1 | 12/2011 | Gertner |
| 2012/0095357 A1 | 4/2012 | Tran |
| 2012/0158011 A1 | 6/2012 | Sandhu |
| 2012/0165672 A1 | 6/2012 | Hill |
| 2012/0235084 A1 | 9/2012 | Lefenfeld |

FOREIGN PATENT DOCUMENTS

| | | |
|---|---|---|
| CN | 1558871 | 12/2004 |
| DE | 19631794 A1 | 8/1997 |
| DE | 19809420 | 5/1998 |
| EP | 0094983 | 11/1983 |
| EP | 0103035 | 3/1984 |
| EP | 0117316 | 5/1984 |
| EP | 1900688 A1 | 3/2008 |
| GB | 895690 | 5/1962 |
| JP | 52009963 | 1/1977 |
| JP | 55031437 | 3/1980 |
| JP | 2004225144 A | 8/2004 |
| JP | 2006318815 | 11/2006 |
| JP | 2009046390 | 3/2009 |
| JP | 2009057278 | 3/2009 |
| JP | 5173932 | 11/2013 |
| RU | 2009714 | 3/1994 |
| RU | 1729027 | 11/1994 |
| RU | 2050330 | 12/1995 |
| RU | 2157338 | 10/2000 |
| RU | 2193008 | 11/2002 |
| RU | 2243157 C2 | 2/2003 |
| RU | 2232714 | 7/2004 |
| WO | 9419280 | 1/1994 |
| WO | 9929624 | 6/1999 |
| WO | 0078675 | 12/2000 |
| WO | 03037794 A1 | 5/2003 |
| WO | 03041857 | 5/2003 |
| WO | 2004057481 | 7/2004 |
| WO | 2006094968 A1 | 9/2006 |
| WO | 2009131628 A1 | 10/2009 |

(56) References Cited

FOREIGN PATENT DOCUMENTS

OTHER PUBLICATIONS

Yokoyama, Takushi, et al., A Study of the Alumina-Silica Gel Adsorbent for the Removal of Silicic Acid from Geothermal Water: Increase in Adsorption Capacity of the Adorbent due to Formation of Amorphous Aluminosilicate by Adsorption of Silicic Acid, J. of Colloid and Interface Science, 2002, pp. 1-5, vol. 252, Elsevier, US.
Bloomquist, R. Gordon, Economic Benefits of Mineral Extraction from Geothermal Brines, Proceedings of the Sohn International Symposium, 2006, pp. 553-558, vol. 6, WA, US.
Bouguerra, W., et al., Equilibrium and kinetic studies of adsorption of silica onto activated alumina, Desalination, 2007, pp. 141-146, vol. 206, Elsevier, US.
Chiba, Removal of Arsenic and Silicon Dioxide Contained in Industrial Waste Water, 1980.
Cole, Peter, et al., Zinc Solvent Extraction in the Process Industries, Mineral Processing and Extractive Metallurgy Review, 2003, pp. 91-137, vol. 24, AF.
Dreisinger, David, et al., New Developments in the Boleo Copper—Cobalt—Zinc—Manganese Project, 2006, Alta, pp. 1-36, Baja Mining Corp., US.
Gallup, Darrell, et al., Laboratory investigation of silica removal from geothermal brines to control silica scaling and produce usable silicates, Applied Geochemistry, 2003, pp. 1597-1612, vol. 18, Elsevier, US.
Gallup, D. L., et al., Heavy Metal Sulfide Scaling in a Production Well at the Salton Sea Geothermal Field, Geothermal Resources Council Transactions, 1990, pp. 1583-1590, vol. 14, Part II, US.
Gotfryd, Leszek, et al., Recovery of Zinc(II) From Acidic Sulfate Solutions, Simulation of Counter-Current Extraction-Stripping Process, Physicochemical Problems of Mineral Processing, 2004, pp. 113-120, vol. 38.
Hamzaoui, Lithium recovery from highly concentrated solutions: Response surface methodology (RSM) process parameters optimizations, Hydrometallurgy, 2008, pp. 1-7, vol. 90, UK.
Kawai, Toshihide, et al., Solvent Extraction of Zinc(II) and Manganese(II) with 5,10,15,20-Tetraphenyl-21H,23H-Porphine (TPP) through the Metal Exchange Reaction of Lead(II)-TPP, Solvent Extraction Research and Development, 2000, pp. 36-43, vol. 7, Japan.
Ku, Young, et al., The Adsorption of Fluoride Ion From Aqueous Solution by Activated Alumina, Water, Air, and Soil Pollution, 2002, pp. 349-360, vol. 133, Netherlands.
Lee, Man, et al., Solvent extraction of Zinc from Strong hydrochloric acid solution with alamine 336, 30(7) Bull Korean Chem. Soc. (2009), pp. 1526-1530, Korea.
Manceau, Alain, et al., Nanometer-sized, divalent-MN, hydrous silicate domains in geothermal brine precipitates, American Mineralogist, 2005, pp. 371-381, vol. 90, US.
Pascua, Chelo, et al., Uptake of dissolved arsenic during the retrieval of silica from spent geothermal brine, Geothermics, 2007, pp. 230-242, vol. 36, Elsevier, US.
Potapov, V.V., et al., Experiments on Silica Precipitation from Hydrothermal Solution and Utilization of Precipitated Material, Thirtieth Workshop on Geothermal Reservoir Engineering, 2005, pp. 1-9, Stanford, US.
Potapov, V.V., Silica Precipitation From Hydrothermal Solution, Journal of Mining Science, 2004, pp. 101-112, vol. 40, US.
Prokuyev, Mutual Influence of Zinc(II) and Cadmium (II) in Case of Extraction from Lithium Chloride Solutions with Tributyl Phosphate, 1982.
Pyman, The point of zero charge of amorphous coprecipitates of silica with hydrous aluminium of ferric hydroxide, Clay Minerals, 1979, pp. 87-92, vol. 14, US.
Ryabstev, A.D., et al., Preparation of High-Purity Lithium Hydroxide Monohydrate from Technical-Grade Lithium Carbonate by Membrane Electrolysis, Russian Journal of Applied Chemistry, 2004, pp. 1108-1116, vol. 77, No. 7, Russia.
Schultze, Techniques for Recovering Metal Values From Postflash Geothermal Brines, Trasnactions Geothermal Resources Council, 1984, pp. 2-5, vol. 8, Bureua of Mines, Reno, Nevada.
Schultze, L.E., Operation of a Mineral REcovery Unit on Brine From the Salton Sea Known Geothermal Resource Area, Report of Investigations 8680, Bureau of Mines, 1982, pp. 1-12, vol. 506, US.
Sheikholeslami, R., et al., Silica and metals removal by pretreatment to prevent fouling of reverse osmosis membranes, Desalination, 2002, pp. 255-267, vol. 143, Elsevier, US.
Song, et al., Temperature-dependent properties of FePO4 cathode materials, Materials Research bulletin, 37, 2002, 1249-1257, US.
Topracki, Fabrication and Electrochemical Characteristics of LiFePO4 Powders for Lithium Ion Batteries, KONA Powder and Particles Journal, 2001, vol. No. 26, pp. 50-73, US.
Umetani, Solvent Extractions of Lithium and Sodium with 4-Benzoyl or 4-Perfluoracyl-5-Pyrazolone and Topo, Talanta, 1987, pp. 779-782, vol. 34, No. 9, Pergamon Journals Ltd., Great Britian.
Wilcox, Selective lithium ion extraction with chromogenic monoaza crown ethers, Analyica Chimica Acta, 1991, pp. 235-242, vol. 245, Elsevier Science Publishers, B.V., Amsterdam.
Abe, Synthetic Inorganic Ion-Exchange Materials, XXXIV, Selective Separation of Lithium from Seawater by Tin(IV) Antimonate CatioN Exchanger, Hydrometallurgy, 1984, pp. 83-93, vol. 12, Elsevier Science Publications B.V. Amsterdam, The Netherlands.
Fujii, Dependence of adsoptive capabaility for lithium ions in molten salt on surface properties of activated alumina, Nippon Seramikkusus Kyokai Gakujutsu Ronbunshi, 1994, p. 12, vol. 102, Japan.
Hawash, Methodology for Selective Adsorption of Lithium Ions onto polymeric Aluminum (III) Hydroxide, Journal of American Science, 2010 pp. 301-309, vol. 6.
Isupov, Synthesis, Structure, Properties, and Application of Aluminum Hydroxide Intercalation Compounds, chemsitry for Sustainable Development, 2000, pp. 121-127, vol. 8, RU.
Menzheres, Solid State Interaction of Aluminium Hydroxide with Lithium Salts, Journal of Materials Synthesis and Processing, 1989, pp. 239-244, vol. 7, No. 4, Plenum Publishing Corp, US.
Nan, Receoveyr of metal values from spent lithium ion batteries with chemical deposition and solvent extraction. Journal of Power Sources, 2005, pp. 278-284, vol. 152, UK.
Ryabstev, Sorption of Lithium from Brine Onto Grandular LiCl—2A1(OH)3—mH2O Sorbent Under Synamic Conditions, Russian Journal of Applied Chemistry, 2002, pp. 1069-1074, vol. 75, No. 7, RU.
Ryabstev, Preparation of high-purity lithium hydroxide monohydrate from technical grade lithium carbonate by membrane electrolysis, 2004.
Samoilov, Extracting Lithium from Waste Solutions of Chemico-Metallurgical Lithium Carbonate Production. Theoretical Foundations of Chemical Engineering, 2008, pp. 714-717, vol. 42, No. 5, RU.
Yang, Optimization of operation conditions for extracting lithium ions from calcium chloride type oilfield brine, International Journal of Minerals, Metallurgy, and Materials, 2012, pp. 290-294, vol. 19, Issue 4, US.
P. Schmittinger, Wiley-VC, Chlorine Principles and Industrial Practice, Chlor-Alkali Process pp. 19-22, 2008.
P. Schmittinger, Wiley-VC, Chlorine Principles and Industrial Practice, Membrane Process pp. 77-107, 2008.

* cited by examiner

PREPARATION OF LITHIUM CARBONATE FROM LITHIUM CHLORIDE CONTAINING BRINES

RELATED APPLICATIONS

This application claims priority to U.S. Provisional Patent Application Ser. No. 61/172,540, filed on Apr. 24, 2009, which is incorporated herein by reference in its entirety.

BACKGROUND OF THE INVENTION

1. Technical Field of the Invention

This invention generally relates to the field of recovering lithium from lithium containing solutions. More particularly, the invention relates to the preparation of lithium carbonate from lithium chloride containing brines.

2. Description of the Prior Art

It is known that geothermal brines can include various metal ions, particularly alkali and alkaline earth metals, in varying concentrations, depending upon the source of the brine. Recovery of these metals is important to the chemical and pharmaceutical industries.

Geothermal brines are of particular interest for a variety of reasons. First, geothermal brines provide a source of power due to the fact that hot geothermal pools are stored at high pressure underground, which when released to atmospheric pressure, can provide a flash-steam. The flash-stream can be used, for example, to run a power plant. Additionally, geothermal brines typically contain various useful metals, such as, lithium, lead, silver and zinc, each of which can be recovered from the brine for further use.

Lithium may be recovered from ores, as the ore may be baked with sulfuric acid, and the product leached with water. The resulting lithium sulfate solution is treated with lime and soda ash to remove calcium and magnesium, and lithium is then precipitated as a carbonate. Other known methods for recovering lithium from ores include alkaline methods and ion-exchange methods, each of which can yield solutions of lithium as hydroxide, chloride or sulfate. These methods may also include the removal of calcium and magnesium by treatment with lime and soda ash.

Typically, the economic recovery of lithium from natural, predominantly chloride, brines (which may vary widely in composition), depends not only on the overall lithium content, but also upon the concentrations of interfering ions, particularly calcium and magnesium, which can greatly effect the performance and economics of the lithium recovery. Magnesium can be difficult to remove because it is chemically similar to lithium in solution. Generally, at low concentrations, magnesium may be removed by precipitation with lime as magnesium carbonate. At higher magnesium concentrations, removal with lime is not feasible and various ion exchange and liquid-liquid extraction methods have been proposed.

Although conventional processing of ores and brines makes it possible to eliminate major portions of interfering ions, there remains a need for the simplified removal of interfering ions from brines for the production of lithium carbonate.

SUMMARY OF THE INVENTION

A method for the preparation of lithium carbonate from a lithium chloride containing solution is provided. Specifically, a method for the preparation of lithium carbonate from geothermal, smackover, and other brines is provided.

In one aspect, a method for preparing lithium carbonate from a lithium chloride containing solution is provided. The method includes the steps of supplying a lithium chloride containing solution to a silica removal step to produce a silica-lean lithium chloride containing solution, wherein the silica removal step is operable to remove at least a portion of silica present in the lithium chloride containing stream. The silica-lean lithium chloride containing solution is supplied to a lithium chloride capture step, wherein the lithium chloride capture step is operable to selectively capture said lithium chloride from the silica-lean lithium chloride containing stream. Lithium chloride is recovered from the lithium capture step to produce a lithium chloride rich stream. The lithium chloride-rich stream is supplied to an electrochemical cell, wherein the electrochemical cell is maintained at conditions sufficient to produce a lithium hydroxide-rich solution. The lithium hydroxide-rich solution is contacted with carbon dioxide to produce lithium carbonate.

In certain embodiments, the method can further include a purification step for decreasing the concentration of at least one of calcium, magnesium, manganese or zinc ions present in the lithium chloride rich stream after the lithium chloride recovery step. The purification step can include the steps of contacting the lithium chloride rich stream with a base; adding a carbonate such that at least a portion of calcium, magnesium, manganese or zinc present precipitates as a solid; and separating the precipitate from the lithium chloride rich stream to produce a solid waste precipitate and a purified lithium chloride rich stream, said purified lithium chloride rich stream having a lower concentration of at least one of calcium, magnesium, manganese or zinc.

In another aspect, a method for the preparation of lithium carbonate from a lithium chloride containing brine solution is provided. The method includes the steps of providing a lithium chloride containing brine solution. At least a portion of silica present in said lithium chloride containing solution is removed to produce a silica-lean lithium chloride containing solution. Lithium chloride is isolated from said silica-lean lithium chloride containing solution. Isolated lithium chloride is recovered to produce a lithium chloride-rich solution. The lithium chloride-rich solution is supplied to an electrochemical cell, which is operated at conditions sufficient to produce a lithium hydroxide solution. Lithium hydroxide solution from said electrochemical cell. Lithium hydroxide solution is then contacted with carbon dioxide to produce a slurry that can include lithium carbonate. Lithium carbonate is then recovered from the slurry.

In another embodiment, a method for preparing lithium carbonate from a lithium chloride containing brine solution is provided. The method can include the steps of supplying a substantially silica-free lithium chloride solution to a lithium chloride capture step, wherein the lithium chloride capture step is operable to capture a substantial portion of the lithium chloride present in the silica-lean lithium chloride containing stream; recovering lithium chloride from the lithium capture step to produce a concentrated lithium chloride rich stream; contacting the concentrated lithium chloride-rich stream and a sodium carbonate solution in a reaction vessel, wherein said sodium carbonate solution is prepared by contacting a sodium hydroxide solution with carbon dioxide gas, wherein the sodium hydroxide is prepared by electrolyzing sodium chloride; separating a product stream from the reaction vessel to provide a lithium carbonate product and a stream comprising sodium chloride; and optionally recycling at least a portion of the sodium chloride stream to the electrochemical cell for the production of sodium hydroxide.

DETAILED DESCRIPTION OF THE INVENTION

Broadly, described herein are methods for the production of lithium hydroxide and lithium carbonate from a lithium chloride containing solution.

Figure 1:
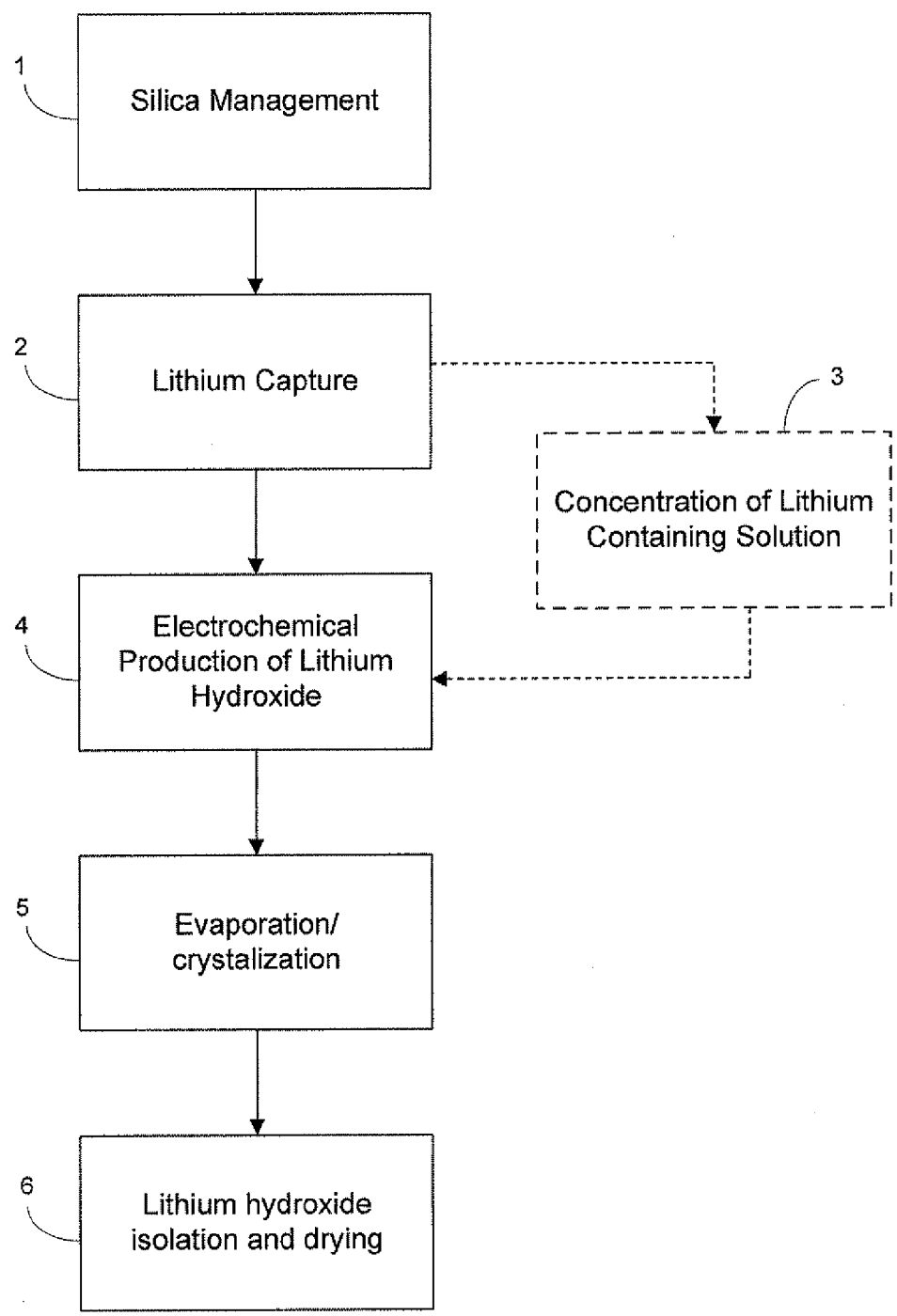
FIG. 1 is a flow chart of the steps of a method for the production of lithium hydroxide from a geothermal brine according to one embodiment of the invention.

As shown in FIG. 1, in one embodiment, the method generally includes a step of providing a lithium chloride containing solution, such as for example, a geothermal brine, a silica removal step, a lithium chloride extraction step, an optional lithium chloride concentration step, an electrochemical lithium hydroxide production step, an evaporation step, and a lithium hydroxide isolation and drying step.

Figure 2:
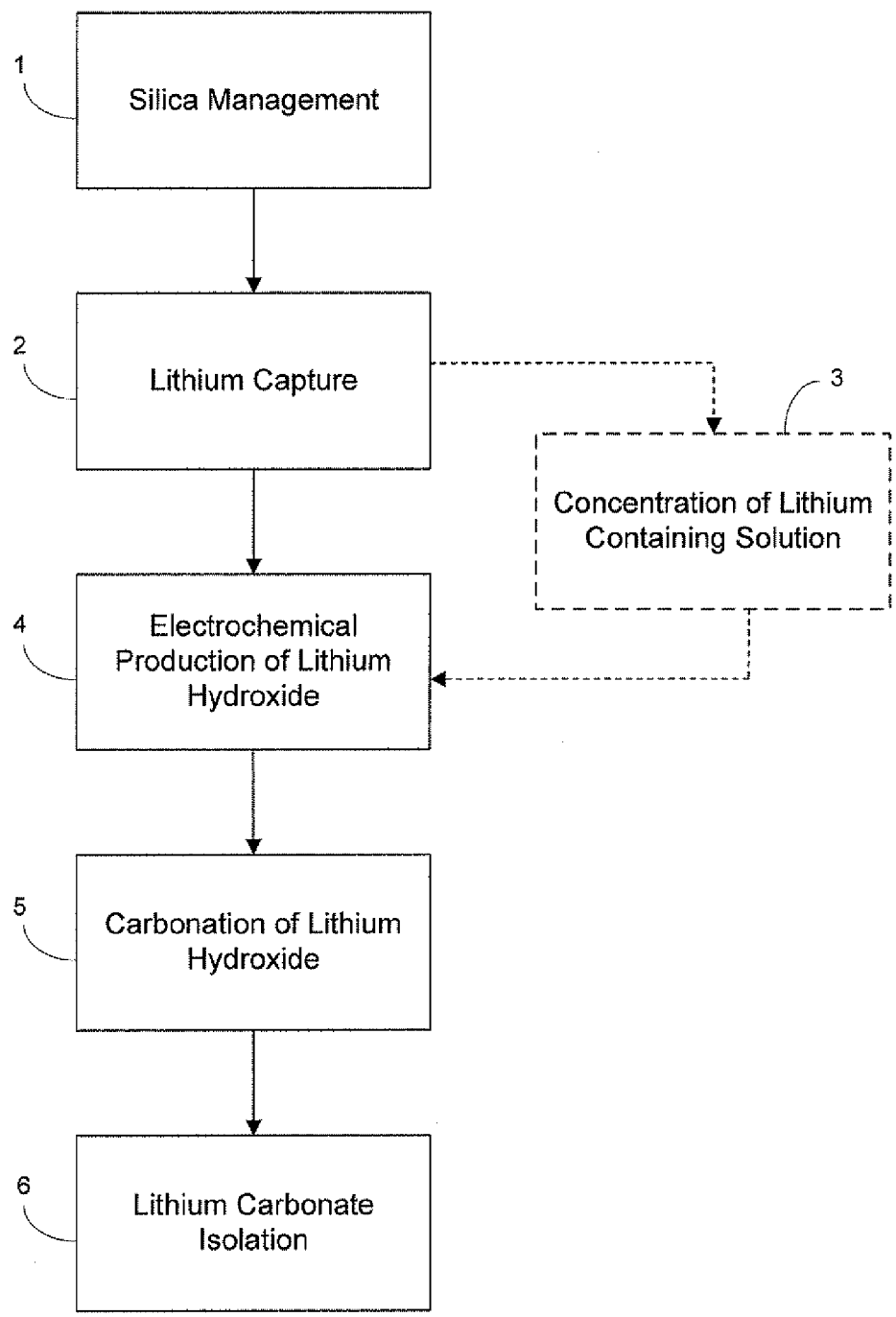
FIG. 2 is a flow chart of the steps of a method for the production of lithium carbonate from a geothermal brine according to one embodiment of the invention.

As shown in FIG. 2, in one embodiment, the method generally includes a step of providing a lithium chloride containing solution, such as for example, a geothermal brine, a silica removal step, a lithium chloride extraction step, an optional lithium chloride concentration step, an electrochemical lithium hydroxide production step, and a carbonation step, whereby lithium hydroxide is converted to lithium carbonate.

As used herein, brine solution refers to a solution of alkali and/or alkaline earth metal salt(s) in water, wherein the concentration of salts can vary from trace amounts up to the point of saturation. Generally, brines suitable for the methods described herein can be aqueous solutions that may include alkali metal or alkaline earth chlorides, bromides, sulfates, hydroxides, nitrates, and the like, as well as natural brines. Brines can be obtained from natural sources, such as, Chilean brines or Salton Sea geothermal resource brines, geothermal brines, sea water, mineral brines (e.g., lithium chloride or potassium chloride brines), alkali metal salt brines, and industrial brines, for example, industrial brines recovered from ore leaching, mineral dressing, and the like. The present methods are equally applicable to artificially prepared lithium chloride solutions.

Accordingly, the present methods include the preparation and recovery of lithium carbonate from solutions that include monovalent cations, including lithium, multivalent cations, monovalent anions, and multivalent anions.

In certain embodiments, silica may be present in the lithium chloride containing solution or geothermal brine, and may be removed by a variety of known methods (e.g., U.S. Pat. No. 4,016,075), prior to use in the methods described herein. Thus, in certain embodiments, the methods for the preparation of lithium carbonate described herein can include a silica management step.

Referring to FIG. 1, provided herein is a multistep method for the isolation of lithium ions from a brine or other lithium containing solution and the subsequent production of lithium carbonate therefrom. In a first step of the method, the brine is supplied to a silica management step, wherein silica is removed from the brine to produce a silica-free brine or lithium containing solution. In a second step of the method, lithium ions are removed from the silica-free brine or lithium containing solution. Optionally, in a third step, the lithium ion containing solution from the second step may be concentrated to produce a concentrated lithium ion containing solution. In a fourth step, the lithium containing solution is supplied to an electrochemical cell to produce a lithium hydroxide containing solution. In a fifth step, water can removed from the lithium hydroxide containing solution from step 4 to crystallize at least a portion of the lithium hydroxide from step 4. In a sixth step, the lithium hydroxide is isolated, recovered, and dried.

Referring to FIG. 2, provided is a multistep method for the isolation of lithium ions from a brine or other lithium containing solution and the subsequent production of lithium carbonate therefrom. In a first step of the method, a brine is supplied to a silica management step, wherein silica is removed from the brine to produce a silica-free brine or lithium containing solution. In a second step, lithium ions are removed from the silica-free brine or lithium containing solution. In an optional third step, the lithium ion containing solution can be concentrated to produce a concentrated lithium ion containing solution. In a fourth step, the lithium containing solution is supplied to an electrochemical cell to produce lithium hydroxide. The lithium hydroxide can be supplied to a fifth step where lithium hydroxide is converted to lithium carbonate. In a sixth step, lithium carbonate is isolated and recovered.

Figure 3:
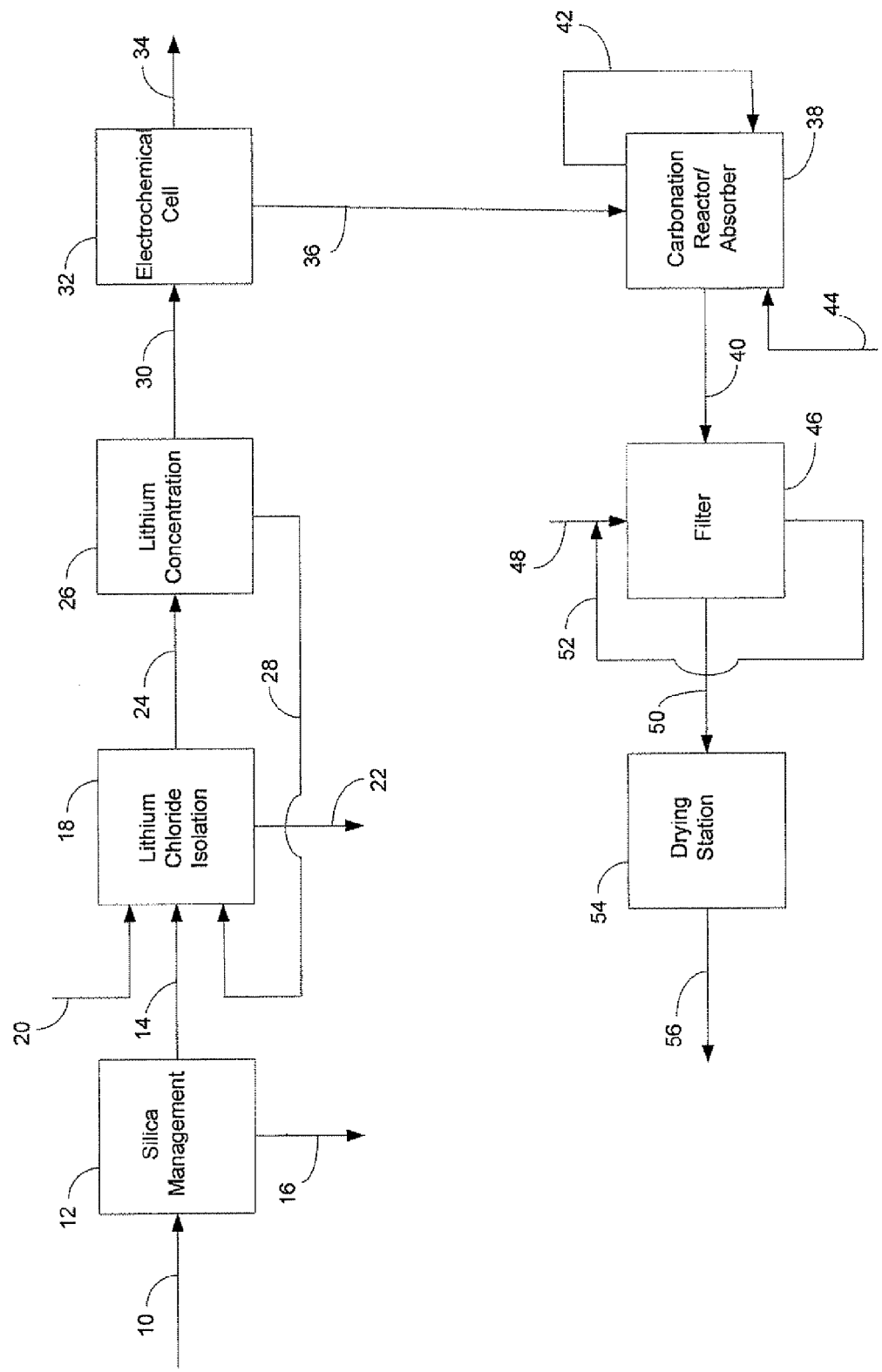
FIG. 3 is a schematic diagram of one embodiment of an apparatus for the production of lithium carbonate from a geothermal brine according to one embodiment of the invention.

Referring to FIG. 3, in one embodiment of the present method, lithium chloride containing solution 10 is provided. As noted above, lithium chloride containing solution 10 can be obtained from a variety of sources, including geothermal brines. The lithium chloride containing solution is supplied to silica management step 12, which operates to significantly reduce the amount of silica that may be present in lithium chloride containing solution 10, such that silicate precipitate 16 and silica-lean lithium chloride containing solution 14 are produced. Preferably, after the silica management step, the silicon concentration in silica-lean lithium chloride containing solution 14 is less than about 150 ppm, more preferably the concentration is less than about 100 ppm, even more preferably the concentration is less than about 50 ppm, and even more preferably the concentration is less than about 25 ppm. In certain embodiments, the concentration of silicon in silica-lean lithium chloride containing solution 14 is less than about 20 ppm, less than about 10 ppm, or even less than about 5 ppm. It is understood that the silica management step may be omitted from the process for brines that do not include silica, or brines that have a substantially low initial silica concentration.

In certain embodiments, silica management step 12 can include the step of contacting lithium chloride containing solution 10 with activated alumina to remove at least a portion of the silica present. Alumina that includes silica bound thereto can be regenerated by contacting the alumina with sodium hydroxide. Alternatively, the lithium chloride containing solution can be contacted with aluminum chloride, which is converted to aluminum hydroxide, and can be used to precipitate silica present in the lithium chloride containing stream. In a further embodiment, iron (II) that may be present in certain lithium containing brines can be oxidized with an oxidant, such as air, hypochlorite, hydrogen peroxide, oxygen, ozone, or a like oxidizing agent, to generate iron (III) chloride, which after adjustment of the pH to above about 5, from an initial pH of about 2.5 to 3.5, will precipitate ferric hydroxide. The ferric hydroxide can adsorb silica from the lithium containing brine. In a preferred embodiment, the pH is adjusted to between about 5 and 6 to induce precipitation of silica and iron. In alternate embodiments, the pH is adjusted to above at least about 4.5 to induce precipitation of silica and iron. In certain embodiments, it is preferred the pH is not increased above about 6, to prevent the precipitation of other ionic species present in the lithium containing brine. In yet another embodiment, iron (II) can be added to the lithium chloride containing solution and oxidized by known means to iron (III), such as with by contacting the iron (II) with an oxidant, such as air, oxygen, ozone, hypochlorite, hydrogen peroxide, or other suitable oxidizing agent. Contacting silica present in the lithium chloride containing solution with the iron (III) compound forms a precipitate when the pH is adjusted to between about 4.5 and 6 with the addition of lime or similar base. It a preferred embodiment, the pH is adjusted to between about between about 5 and 6. In alternate embodiments, the pH must be adjusted to above at least about 4.5 for the silica and iron to precipitate. In certain embodiments, it is preferred the pH is not increased above about 6, to prevent the precipitation of other ionic species.

In addition, silica management step 12 can include any known means for removing a portion of the silica present in the feed stream, while at the same time maintaining the initial concentration of lithium. In one embodiment, lithium chloride containing solution 10 can be contacted with aluminum chloride, iron chloride, aluminum hydroxide, or the like, to form a precipitate with the silicon dioxide. Contacting can be facilitated by known means, such as a mixing device. Solid silica precipitate 16 removed from lithium chloride containing solution 10 can be collected and removed from the mixing or like device, by known means, such as screening or filtering, to yield lithium chloride containing stream 14 that is substantially free of silica.

As known in the art, various membranes can be used to selectively remove specific undesired ions from lithium containing solution 14.

Silica-lean lithium chloride containing stream 14, which is substantially free of silica (measured as $SiO_2$), can be supplied to lithium chloride isolation step. In certain embodiments, silica-lean lithium chloride containing stream 14 can be supplied to at least one intercalated lithium absorbent column 18, which can be configured to absorb and isolate lithium chloride from the silica-lean lithium chloride containing solution, while at the same time allowing other ions, such as calcium, magnesium, and/or sodium, or the like, to pass with water stream 22, through the use of a selective molecular sieve, membrane, or other like materials. In embodiments that include more than one intercalated lithium absorbent column, the bulk of the lithium can be removed in the first intercalated lithium absorbent column, with any subsequent "polishing" intercalated lithium absorbent columns being used to minimize overall lithium loss during the recovery process.

In certain embodiments, the intercalated lithium absorbent column can be operated as follows. Lithium aluminate intercalate particles having an average diameter of between about 100 and 150 µm can be combined with a saturated sodium chloride solution that includes approximately 200 ppm lithium to prepare a slurry, which can then be added to the column. The column may be jacketed, insulated or may include means to provide heating or cooling to the column. The column may include a method of distributing liquid and support for the extraction media and can include fritted ends having a pore size of between approximately 25 and 50 µm, although other like means, such as supports of glass wool or perforated plates, can also be used instead of fritted ends. For the present invention, the operating temperature of the column can be maintained at a temperature that is greater than room temperature, and is preferably maintained at a temperature above about 70° C., more preferably between about 95° C. and 110° C.

The column is maintained wet and is unloaded before the first use by circulating at least about 1 bed volume, preferably about two bed volumes, of deionized water 20 that includes approximately 1000 ppm lithium chloride, at a flow rate of between approximately 1 and 4 bed volumes/hour, preferably between about 1.5 and 2.5 bed volumes/hour. The column is then contacted with approximately one bed volumes of saturated sodium chloride solution containing approximately 200 ppm lithium chloride is then run.

During loading of the column (i.e., during the step of capturing desired lithium chloride), high ionic strength solution 14 containing lithium chloride is supplied to column 18 and the lithium concentration of the effluent at column outlet 22 is measured to determine the point at which the column becomes saturated with the lithium chloride. During the lithium ion capture step, the lithium concentration at outlet 22 remains fairly constant and relatively low, for example, approximately 0 and 100 ppm. The point at which column 18 reaches or nears the point of saturation with lithium ions, however, the concentration of the lithium in the effluent increases, thus indicating that the column has either little or no capacity for additional lithium ions. Upon reaching this point of saturation, flow of the solution that includes lithium chloride to column 18 stopped, and the column is flushed with between about 1 and 8 bed volumes of deionized water, preferably between about 1 and 2.5 bed volumes, and most preferably between about 1 and 1.5 bed volumes, to produce a lithium chloride-rich stream 24. It is understood that the apparatus can include various valves and control devices for controlling the flow of the lithium containing solution or the wash solution to the column.

In certain embodiments, after loading of the column, but before collection of the captured lithium chloride, the column may be flushed with about 1 bed volume of a 26% saturated sodium chloride solution that includes about 200 ppm lithium chloride.

After the removal of lithium chloride from the lithium containing feed stream during the lithium chloride isolation step, intercalated lithium absorbent columns 18 can be regenerated and the lithium chloride recovered therefrom. Specifically, at least about 0.5 equivalents of wash water 20 may be supplied to column(s) 18 to remove absorbed lithium chloride and produce lithium chloride rich solution 24. In certain embodiments, between about 1 to 2 equivalents of wash water 20, or more equivalents, may be used during the regeneration of the columns. In preferred embodiments, the wash water may include lithium ions for the regeneration of the columns. Optionally, low ionic strength liquids, such as alcohols and water/alcohol mixtures can be used to regenerate the columns. In general, the amount of water utilized from the lithium chloride recovery from the column is minimized by recycling the product streams to maximize lithium content, without affecting the capacity of the extracting media.

Optionally, a purification step can be employed to remove calcium, magnesium, or other divalent ions such as zinc and manganese that may be present in lithium chloride-rich stream 24. Removal of calcium, magnesium, and/or other alkaline earth metals can be achieved by known means, such as, by increasing the pH and treating the solution with ion exchange, preferably using selective chelating ion exchange resins, or by the addition of a base, such as lime, sodium hydroxide, lithium hydroxide, or the like, followed by the addition of lithium carbonate, sodium carbonate, potassium carbonate, ammonium carbonate, or other suitable carbonate, which can precipitate magnesium and iron hydroxide, as well as calcium carbonate. In alternate embodiments, ion exchange means can be employed to facilitate the removal of calcium, magnesium, and/or other alkaline earth metals. Other bases, such as sodium hydroxide and other hydroxides of alkali metals, can also be used. In certain brines, it may be beneficial to remove boron from the product stream at this point process by known means, such as by precipitation, solvent extraction, or ion exchange.

Lithium chloride-rich stream 24 may have a concentration of between about 1% and 42% by weight, preferably greater than about 10% by weight, more preferably greater than about 25% by weight. In alternate embodiments, lithium chloride-rich stream 24 may have a concentration of greater than about 10% by weight.

In certain embodiments, lithium chloride containing solution 24 can optionally undergo a purification or concentration step prior to being provided to electrolytic process 32. Methods for the isolation and purification of lithium chloride from brines, including geothermal brines, are known in the art, for example, as described in U.S. Pat. Nos. 4,036,713 and 5,951,843, each of which is herein incorporated by reference in its entirety.

Optionally, the process can include steps for increasing the concentration of the lithium chloride stream. Specifically, lithium concentration means 26 can be utilized for the removal of a portion of the water in the lithium chloride stream, for example, by evaporation, thereby producing a more concentrated lithium chloride solution 30. Exemplary concentration means can include electrodialysis, steam evaporation, or solar evaporation. Water 28 removed from the lithium chloride containing solution can be recovered, for example by evaporation and subsequent condensation, and resupplied to intercalated lithium absorbent column(s) 18, or can be supplied to any other step in this or an associated process that requires the supply of water. Alternatively, water 28 can be supplied to a geothermal well. In embodiments employing a concentration step, overall concentration of concentrated lithium chloride-rich solution 30 can be increased to greater than 25% lithium chloride by weight, preferably up to about 40% lithium chloride by weight.

Concentrated lithium chloride-rich solution 30 can be supplied to electrochemical cell 32, which includes at least one anode, one cathode and a permeable membrane, for the electrochemical preparation of lithium hydroxide. Electrochemical cells suitable for large scale production are commercially available from companies, such as, DeNora, Chlorine Engineers, and Asahi Glass, to name a few. Specifically, chloride ions are oxidized to chlorine at the anode and water is reduced to hydroxide ions and hydrogen gas at the cathode. Preferably, concentrated lithium chloride-rich solution 30 is substantially free of other ions, particularly ions that may interfere with the electrochemical reaction. Optionally, a lithium chloride-rich stream can supplied directly to the electrochemical reaction, without being first being subjected to the silica management and lithium ion sequestration steps, provided that the lithium chloride-rich stream is substantially free of non-lithium ions, particularly non-lithium ions that may interfere with the electrochemical reaction. In certain embodiments, the concentration of sodium and/or potassium ions in concentrated lithium chloride-rich solution 30 is less than about 5% by weight, preferably less than about 3% by weight. Cations such as iron, calcium, magnesium, and the like, if at all present, preferably have a total concentration of less than about 0.001% by weight, more preferably less than about 0.005% by weight, and even more preferably less than about 0.00001% by weight. Higher concentrations of the interfering ions does not necessarily preclude operation of the electrochemical cell, but instead may reduce the overall life of the cell components and/or the overall effectiveness of the reaction.

Similar to that which is noted above with respect to the presence of non-lithium interfering cations, electrochemical cell 32 preferably has a total non-chloride anion content of less than about 5% by weight, preferably less than about 3% by weight, and even more preferably less than about 1% by weight.

The cathode of electrochemical cell 32 can be any suitable material, including nickel, catalyzed nickel mesh, stainless steel, coated stainless steel, mild steel, and the like. Other exemplary catalysts can include mixed ruthenium compounds, platinum and other similar compounds that have low hydrogen over potential. The total area of the cathode can be adjusted based upon reactor size and desired production. The catholyte feed of the electrochemical cell 32 can be any suitable material having sufficient ions to carry a current. While water may be employed, and in certain embodiments, the addition of lithium carbonate or lithium hydroxide may be beneficial to the operation of the cell.

The anode of electrochemical cell 32 can be any suitable material, such as titanium mesh coated with ruthenium oxide, titanium mesh coated with platinum, carbon, or the like. Preferably, the anode is a dimensionally stable anode, allowing for reduced power consumption. Dimensionally stable titanium anodes are particularly well-suited for chlorine environments as the titanium substrate is resistant to corrosion. The total area of the anode can be adjusted based upon reactor size and desired production. The anolyte of electrochemical cell 32 can be any suitable material, including a lithium chloride solution having a concentration of between of about 1% by weight to saturation, preferably between 5% and 40% by weight, more preferably between about 10% and 35% by weight.

The materials for construction of electrochemical cell 32 can be any material that is chemically resistant to chlorine, activated chlorine, oxygenated chlorine species, and other dissolved species that may exist in brine solutions. Exemplary materials for the construction of electrochemical cell 32 include polytetrafluoroethylene (PTFE), polyvinylidene fluoride (PVDF), HALAR (alternating co-polymers of ethylene and chlorotrifluoroethylene (CTFE)), and other fluorinated or partially fluorinated.

The membrane of electrochemical cell 32 can be any suitable semi-permeable cation selective membrane that selectively passes cations and inhibits the passage of anions. Such membranes are known in the art. One exemplary membrane is Nafion (E.I. DuPont de Nemours & Co.), particularly the Nation 300, 400 and 900/9000 series of materials. Other suitable membranes can be supplied by Flemion, however any suitable membrane material can be used provided the material is chemically resistant to both chlorine and lithium hydroxide. The membrane may be placed between the anolyte being electrolyzed and the catholyte.

In certain embodiments, the process can optionally include one or more filter or separation-purification step prior to the step of supplying concentrated lithium chloride solution 30 or brine to electrochemical cell 32.

During operation of electrochemical cell 32, a current density of between about 500 and 10,000 $A/m^2$ can be applied at a voltage of between about 1.5 and 5 volts. Preferably, a current density of between about 2000 and 7000 $A/m^2$ is applied.

Electrochemical cell 32 may be operated at a temperature of between about 60° and 100° C., preferably between about 70° and 95° C., and more preferably between about 90° and 95° C. Cell 32 can be operated at atmospheric pressure, or slightly above atmospheric pressure.

Operation of electrochemical cell 32 produces lithium hydroxide in solution, and also evolves chlorine and hydrogen gas by products, which can be removed from the electrochemical cell via lines 34 and 35, respectively.

The efficiency of electrochemical cell 32 is at least about 60%, preferably at least about 70%, more preferably at least about 80%, more preferably at least about 90%, more preferably at least about 95%, and even more preferably at up to about 99.9%. The electrolysis can be operated continually until the lithium hydroxide content reaches about 17% by weight, at which time the lithium hydroxide solution may be removed and supplied to a carbonation reactor. At lithium hydroxide concentrations greater than about 17% by weight, the lithium hydroxide in solution can begin to precipitate. Electrochemical cell 32 can also be operated under conditions designed to produce lower concentration lithium hydroxide solutions and the lower concentration lithium hydroxide solution can be recycled to and from the carbonation reactor. In certain embodiments, electrochemical cell 32 can also include a feed line (not shown) for supplying water, low concentration lithium hydroxide, low concentration lithium carbonate, or combinations thereof to the cell.

Lithium hydroxide solution 36 is supplied from electrochemical cell 32 to carbonation reactor/absorber 38 and can be contacted with carbon dioxide gas 44, for example, in an up-flow fashion. Carbonation reactor/absorber 38 can include a series of trays or other like means that are designed to allow lithium hydroxide 36 to be supplied to the top of the reactor and flow in a downward fashion through the reactor, thereby contacting up-flowing carbon dioxide gas 44, which can be introduced near the bottom of carbonation reactor/absorber 38. In alternate embodiments, carbonation reactor/absorber 38 can include various mixing means designed to facilitate mixing of liquids and gases. Optionally, carbonation reactor/absorber 38 can be a jacketed batch reactor having thermostatic heating. The reaction produces lithium carbonate solid. The concentration of the lithium carbonate slurry is preferably at least about 1.5% by weight lithium carbonate, more preferably at least about 6% by weight lithium carbonate. Carbon dioxide can be captured and recycled to carbonation reactor/absorber 38 via line 42.

In certain embodiments, the lithium carbonate can produced by reaction of lithium hydroxide with sodium carbonate in water, wherein the mixture is heated, preferably to a temperature of between about 90° C. and 95° C., with stirring. The reaction produces solid lithium carbonate and a sodium chloride solution, wherein the sodium chloride solution can be separated by filtration from the desired lithium carbonate solids.

Lithium carbonate solution 40 can be supplied to filtration means 46, which is operable to separate lithium carbonate containing slurry 40 into water stream 52, which may optionally be resupplied to the filtration means, and solid lithium carbonate product 50. Filtration means 46 can, for example, include a series of screens or filters and water supply 48. Optionally, water can be recycled to the process via line 52. Optionally, lithium carbonate can be concentrated from the slurry by centrifugation or decantation thickening. Water collected during the separation of the solids from the slurry via filtration means 46 can be supplied to the electrochemical cell, or may be supplied to a geothermal well or reservoir. In certain embodiments, lithium carbonate solid can be retained on a band filter and supplied to a wash step, wherein hot water, preferably having a temperature of between about 90° C. and 95° C. is used to wash the solids. In certain embodiments, the aqueous solution collected via filtration means 46 can have a pH of greater than about 9, most likely having a pH between about 10-12. Alternatively, sufficient acid can be added to the aqueous solution to achieve a pH of between about 5 and 8.5, and the acidified water can then be supplied to the intercalated lithium absorbent column(s). Alternatively, the solution can be returned directly to the cathode side of the electrolysis cell without prior neutralization.

The solid lithium carbonate 50 is supplied to a drying station 54, which can optionally include heating means, as well as lines for supplying nitrogen or other inert gases to the chamber. Dried lithium carbonate product 56 can then be collected, packaged and transported for further use.

Figure 4:
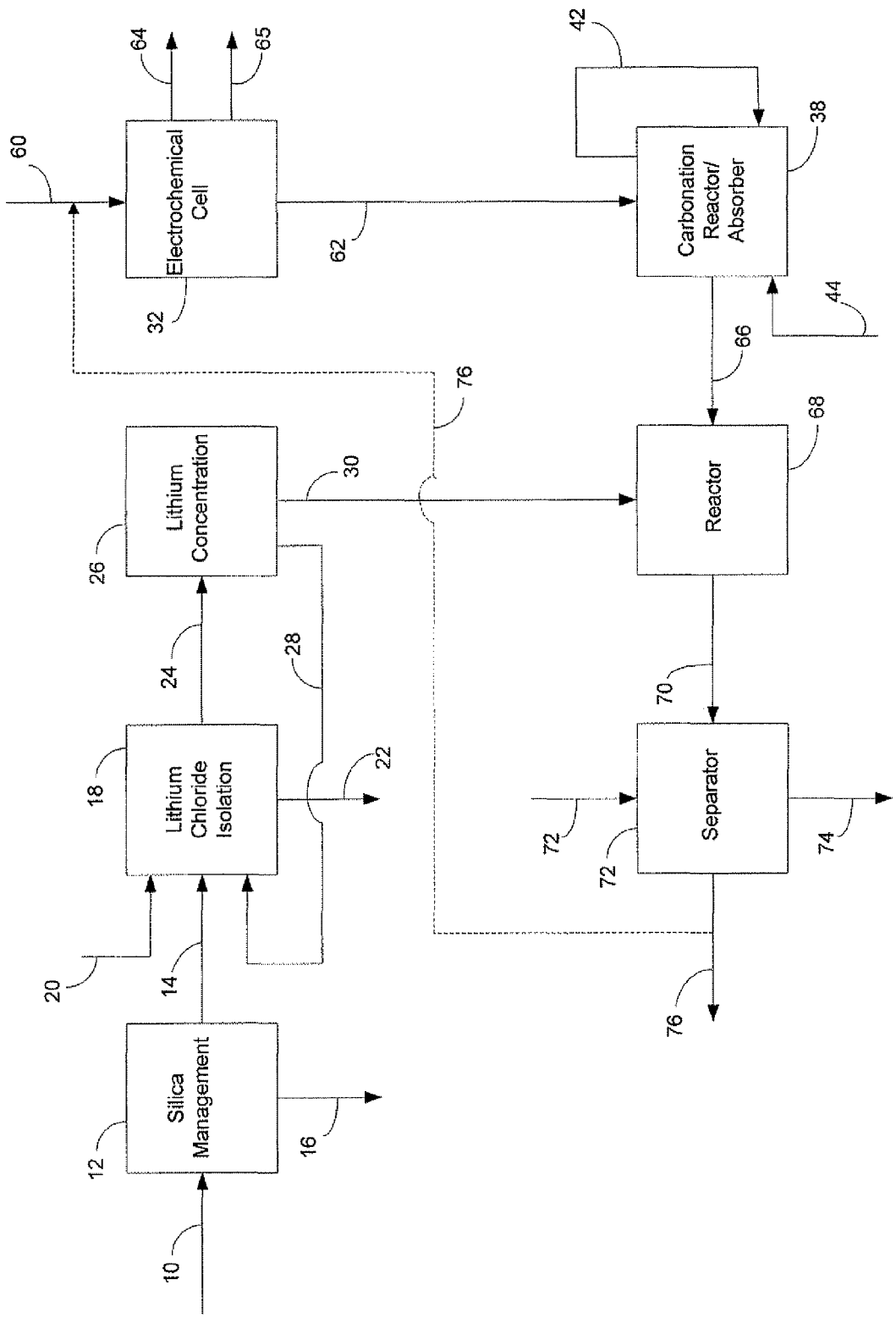
FIG. 4 is a schematic diagram of one embodiment of an apparatus for the production of lithium carbonate from a geothermal brine according to one embodiment of the invention.

Referring now to FIG. 4, an alternate embodiment for the production of lithium carbonate is provided. Lithium chloride stream 30 is provided by the process described above and as shown in FIG. 3. To electrochemical cell 32, which is as described above, sodium chloride stream 60 is provided. Sodium chloride stream 60 is then subjected to electrolysis to produce sodium hydroxide stream 62 and chlorine and hydrogen gases 64. Reaction conditions for the production of sodium hydroxide by electrolysis of sodium chloride are known in the art.

In certain embodiments, the efficiency of the electrolysis of sodium chloride is at least about 70%, alternatively at least about 80%, alternatively at least about 90%, or alternatively at least about 95%. In certain embodiments, sodium hydroxide solution 62 is produced in at a concentration of at least about 10% by weight, more preferably at least about 30% by weight, and most preferably about 35% by weight.

Chlorine and hydrogen gases 64, 65 from electrochemical cell 32 can be combusted and scrubbed with water to generate hydrochloric acid, which may be used within the process, or alternately may be purified, compressed, and sold commercially.

Sodium hydroxide stream 62 is supplied to carbonation reactor/absorber 38, wherein the sodium hydroxide stream is contacted with carbon dioxide steam 44, for example, in an up-flow fashion. Carbonation reactor/absorber 38 can include a series of trays, designed to allow sodium hydroxide stream 62 to be supplied to the top of the reactor and flow in a downward fashion through the reactor, thereby contacting up flowing carbon dioxide gas 44, which can be introduced near the bottom of the reactor, to produce sodium carbonate solution or slurry 66. In alternate embodiments, carbonation reactor/absorber 38 can include various mixing means designed to facilitate mixing of liquids and gases. The concentration of the solution is preferably at least 15% by weight sodium carbonate, more preferably at least 25% by weight sodium carbonate. Carbon dioxide can be captured and recycled to carbonation reactor/absorber 38 via line 42.

Sodium carbonate solution 66 is supplied to reaction vessel 68 wherein the solution is contacted with lithium chloride solution 30 to produce slurry 70, which includes lithium carbonate and sodium chloride solution. The step of contacting sodium carbonate solution 66 and lithium chloride solution 30 in the reaction vessel can be at a temperature greater than about 60° C., preferably greater than about 80° C., and even more preferably between about 90° C. and 95° C. In certain embodiments, reaction vessel 68 can be a stirred tank reactor. Alternatively, reaction vessel 68 can be a standard crystallizer. Lithium carbonate is present as a precipitate, while sodium chloride remains in aqueous solution.

Slurry 70, which includes solid lithium carbonate and aqueous sodium chloride, is supplied to separator 72, which can include various means for the separation of solids from liquids including, for example, centrifuge, settling tank, filters, screens, and the like, to produce lithium carbonate product stream 74 and sodium chloride brine solution 76. In order to attain improved product quality, the lithium carbonate can be treated to remove sodium, potassium, and/or chloride ions trapped in the interstitial space of the lithium carbonate precipitate, such as by washing with water, preferably hot water, or by like means. In certain embodiments, separator means 72 can be a band filter or rotary drum, and can optionally be fed through a counter current wash system for the removal of residual sodium chloride. Separator means 72 can also include water inlet 72 and outlet 76 for the washing of the separated solid lithium carbonate. Separator means 72 can also include means for drying and/or the removal of water from the solid lithium carbonate, including for example, centrifuge, heaters, blowers, presses, and the like. Separator means 72 can include a vacuum filter for removal of water. In certain embodiments, it is desirable to optimize the washing step to both maximize purity of the lithium carbonate while minimizing the amount of water used for washing. Sodium chloride solution 76 can be recycled to electrochemical cell 32 for electrolysis. Lithium carbonate product 74 can have a moisture content of less than about 5% by weight, preferably less than about 2% by weight, and even more preferably less than about 0.5% by weight.

The brine solution 76 from separator means 72 can include sodium chloride and lithium carbonate. Generally, depending upon the amount of water utilized in the process and during the wash process, the ratio of sodium chloride to lithium carbonate is at least about 20:1, more preferably at least about 25:1, and even more preferably at least 30:1. In certain embodiments, the ratio of sodium chloride to lithium carbonate in the brine solution can be about 35:1.

In certain embodiments, brine solution 76 can be acidified with hydrochloric acid (not shown) to a pH of less than about 4, preferably about 3, and recycled to electrochemical cell 32. The hydrochloric acid can be supplied from electrochemical cell 32.

The lithium carbonate production method proposed in FIG. 4 is advantageous because the process eliminates, or nearly eliminates, the production of waste products. Specifically, in certain embodiments, the recycle of unused metal salts, for example sodium chloride, and carbon dioxide, the overall yield can be quantitative or nearly quantitative.

Figure 5:
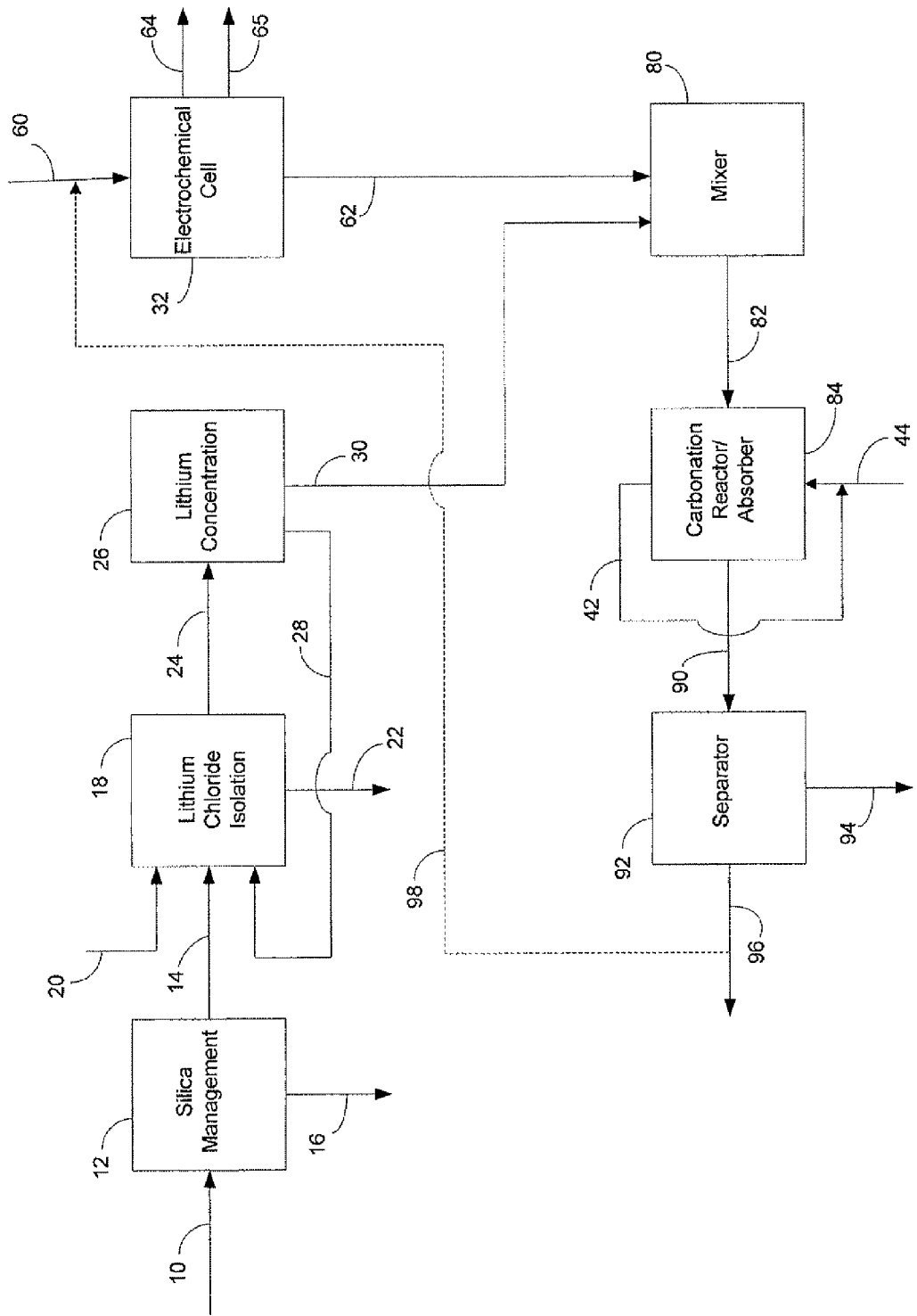
FIG. 5 is a schematic diagram of one embodiment of an apparatus for the production of lithium carbonate from a geothermal brine according to one embodiment of the invention.

Referring now to FIG. 5, another alternate embodiment for the production of lithium carbonate is provided. The method is a single step process wherein sodium carbonate is produced and reacted with recovered lithium chloride, however may require additional input and produces a waste lithium chloride stream that may include small amounts of lithium carbonate entrained therein.

A lithium chloride stream is provided as described above and as shown in FIG. 3. To electrochemical cell 32 sodium chloride stream 60 is provided. Sodium chloride stream 60 is subjected to electrolysis to produce sodium hydroxide 62 and chlorine and hydrogen gases 64, 65, respectively.

Sodium hydroxide stream 62 is supplied to mixer 80, wherein the sodium hydroxide stream is combined and mixed with lithium chloride stream 30. Mixing of sodium hydroxide stream 62 and lithium chloride stream 30 can be by known means, such as by agitators or mixers, with ultrasonic waves, or by the like. Mixer 80 produces mixed stream 82, which includes sodium hydroxide and lithium chloride in aqueous solution. In certain embodiments, it may be preferred that lithium chloride steam 30 has a concentration of at least about 20% by weight, more preferably at least about 28% by weight, and even more preferably about 42% by weight. Similarly, in certain embodiments, it may be preferred that sodium hydroxide stream 62 has a concentration of at least about 15% by weight, more preferably at least about 25% by weight, and even more preferably about 35% by weight.

Mixed stream 82 is supplied to carbonation reactor/absorber 84, which can include a series of trays, designed to allow the mixed stream, which includes lithium chloride and sodium hydroxide, to be supplied to the top of the reactor and flow in a downward fashion through the reactor, thereby allowing the mixed stream to sufficiently contact up-flowing carbon dioxide gas 44, which can be introduced near the bottom of the reactor via line 22, to produce a lithium carbonate slurry 90. Preferably, carbonation reactor/absorber 84 is maintained at a temperature of between about 90° C. and 100° C. In alternate embodiments, reactor 84 can include various mixing means designed to facilitate mixing of liquids and gases. The concentration of the lithium carbonate is preferably at least 15% by weight, more preferably at least 25% by weight lithium carbonate. Carbon dioxide can be recycled to carbonation reactor 38 via line 42.

Lithium carbonate solution 90 is supplied to separation vessel 92 wherein solid lithium carbonate is produced via line 94. A solution that includes sodium chloride and possibly a small amount of lithium carbonate is produced as stream 96.

Sodium carbonate solution 90, which includes solid lithium carbonate and aqueous sodium chloride, is supplied to separator means 92, which can include various means for the separation of solids from liquids including, for example, centrifuge, settling tank, filters, screens, and the like. Separator means 92 can also include water inlets and outlets (not shown) for the washing of the separated solid lithium carbonate. Separator means 72 can also include means for drying and/or the removal of water from the solid lithium carbonate, including for example, centrifuge, heaters, blowers, presses, and the like. A solid sodium carbonate product is collected via line 94. Optionally, a portion of sodium chloride stream 96 can be recycled to electrochemical cell 32. Optionally, the sodium chloride solution can be recycled to the washing step of the lithium extraction media. In certain embodiments, the sodium chloride required for the process can be generated by the selective crystallization of sodium chloride from the geothermal, Smackover, or other brine.

In certain embodiments, the process may include means for the neutralization of any lithium carbonate that is included in the sodium chloride solution, such as by neutralizing the solution by adding an effective amount of hydrochloric acid or like acid. In embodiments wherein the lithium carbonate can be effectively removed, the solution can be recycled to the electrochemical cell, however, any lithium carbonate included therein may cause problems with the performance of the electrochemical cell.

EXAMPLES

Example 1

Carbonation of Sodium Hydroxide. Carbonation of sodium hydroxide was carried out using a 3 liter jacketed reactor with a heating system (manufactured by Syrris Reactor Systems, UK). The reaction was carried out at a temperature of about 95° C. using a one liter of a 9.5 M solution of sodium hydroxide (27.5% solids). Carbon dioxide was supplied for about 1 hour at the rate of 3 L/min. (totaling approximately 8 moles, approximately 1.7 molar equivalents) to ensure the complete conversion of sodium hydroxide. At the end of the carbonation of the sodium hydroxide solution, a clear solution of sodium carbonate was obtained, at which point the carbonation reaction was stopped and heating of the sodium carbonate solution was continued for few minutes. To the clear solution, lithium carbonate seeds were added before reacting it with a lithium chloride solution (404 g lithium chloride in 1000 mL). Experimental yield was 95%. Yields varied for other similar reactions depending upon experimental conditions and were as high as about 100% in some cases. The purity of the isolated lithium carbonate was approximately 96.6% before washing.

Before the first washing of the product stream, the lithium carbonate had the following impurities: Na (71 mg/kg), Ca (2.8 mg/kg), Mg (2.1 mg/kg), Fe (0.3 mg/kg), Ba (0.1 mg/kg), Mn (0.08 mg/kg), and Sr (0.03 mg/kg), for a purity of about 78.4%. After washing with approximately 2-3 volume equivalents of water, the sodium concentration is reduced to undetectable levels and the lithium carbonate had the following impurities: Mg (5.9 mg/kg), Ca (2.9 mg/kg), Ba (0.4 mg/kg), Fe (0.4 mg/kg), Mn (0.07 mg/kg), and Sr (0.07 mg/kg), for a purity of greater than 99%.

The washing conditions may affect the amount of sodium carbonate/chloride entrained in the lithium carbonate product.

Example 2

The electrolysis process converts a purified, concentrated lithium chloride solution into a concentrated lithium hydroxide solution for subsequent conversion to lithium bicarbonate. The limiting factor determining the efficiency of the electrochemical cell is the concentration of lithium hydroxide in the catholyte, due to back-migration of hydroxide across the membrane. Therefore, the experiment was designed wherein the electrochemical cell was operated at four different hydroxide concentrations to map the effect of the lithium hydroxide concentration and determine the maximum concentration that could be prepared. The experiment was designed to measure the current efficiency and energy utilization of the dialysis process as a function of hydroxide concentration. Within the electrochemical cell, under an applied field, lithium cations migrate from the anolyte to catholyte, while water present is electrolyzed to $H_2$ and $OH^-$ at the cathode. In theory, each electron passed in the external circuit corresponds to an increase of one lithium hydroxide molecule in the catholyte, leading to an increase in concentration of lithium hydroxide with time. The main inefficiency in the process, the back migration of $OH^-$ ions from catholyte to anolyte, is dependent on the $OH^-$ concentration of the catholyte. Therefore, the experiments reported here were performed with the intention of maintaining the $OH^-$ concentration of the catholyte constant by adding water at a known rate. The efficiency of the reaction was measured by comparing the actual rate of addition of water with the theoretical addition.

Example 3

Electrolytic Production of Lithium Hydroxide from Lithium Chloride

Experimental Set-Up. The electrolysis system consisted of the electrolysis cell having anolyte and catholyte flow systems. Electrolysis of lithium chloride solutions was carried out using an FM01 electrolyzer (a scale model of the FM21 electrolyzer used commercially in the chlor-alkali industry) manufatured by ICI. The electrolyzer included lantern blade-style electrodes (anode: ruthenium oxide coated titanium; and cathode: nickel), and a Nafion® 982 membrane. The active surface area of each electrode was about 64 $cm^2$ (4×16 cm), and the cell gap (distance measured anode to cathode) was between about 12-13 mm. The FM01 electrolyzer was operated with the flow parallel to the 16 cm direction (as compared with a flow direction parallel to the 4 cm dimension, as it is intended to be operated), as this improved the management of chlorine and hydrogen gasses evolved from the electrodes. In addition, although anolyte and catholyte flows are normally fed from opposite sides of the cell, in the present experiment, the anolyte and catholyte were fed from the same side of the electrochemical cell.

The anolyte flow system included a feed tank, pump, degassing tank, chlorine scrubber, and collection tank. A lithium chloride solution having a concentration of about 21% by weight was placed in the anolyte feed tank and heated to about 90° C. The heated solution was pumped into the anode chamber of the cell in a single pass mode at a flow rate of about 20 $cm^3$/min, corresponding to a face velocity of about 0.13 cm/s. Upon exiting the cell, the lithium chloride solution and entrained chlorine gas (produced at the anode) were passed through into a degassing tank, which was equipped with a chlorine scrubber, to remove the chlorine. The lithium chloride solution was then pumped into a collection tank for storage.

The catholyte flow system included a feed tank, pump, and water feed system. Lithium hydroxide was placed in the feed tank and heated to about 95° C. and fed to the cathode chamber of the electrochemical cell in recirculating mode at a flow rate of about 50 mL/min, corresponding to a face velocity of about 0.33 cm/s. Water was added continuously to the system using a peristaltic pump to maintain a constant lithium hydroxide concentration. The rate of addition was monitored by the weight loss of the water tank. Nitrogen was bubbled through the catholyte recirculation tank to minimize the reaction of lithium hydroxide and carbon dioxide from the air.

Table 1 summarizes the experimental conditions used in tests to determine the effect of the concentration of the catholyte.

TABLE 1

Experimental parameters for electrolysis experiments.

| Parameter | Value |
| --- | --- |
| Current Density | 3000 $A/m^{-2}$ |
| Electrode Area | 64 $cm^2$ |
| Anolyte Volume | 60 $cm^3$ |

TABLE 1-continued

Experimental parameters for electrolysis experiments.

| Parameter | Value |
|---|---|
| Catholyte Volume | 60 cm$^3$ |
| LiCl Inlet Concentration | 21 wt % |
| LiCl Inlet pH | 0.5-0.7 |
| Temperature | 90° C. |
| Time of Operation | 2-3 hours |
| Anolyte (LiCl) Flow Velocity | 0.13 cm/s |
| Catholyte (LiOH) Flow Velocity | 0.33 cm/s |

During operation of the electrochemical cell, samples were collected at the catholyte inlet and outlet and anolyte outlet ports every 30 minutes. Cell voltage was monitored at the cell terminals using a handheld multimeter. The difference between the inlet and outlet catholyte hydroxide concentrations and the cell voltage were used to calculate the efficiency and energy consumption of the cell.

Results

Figure 6:
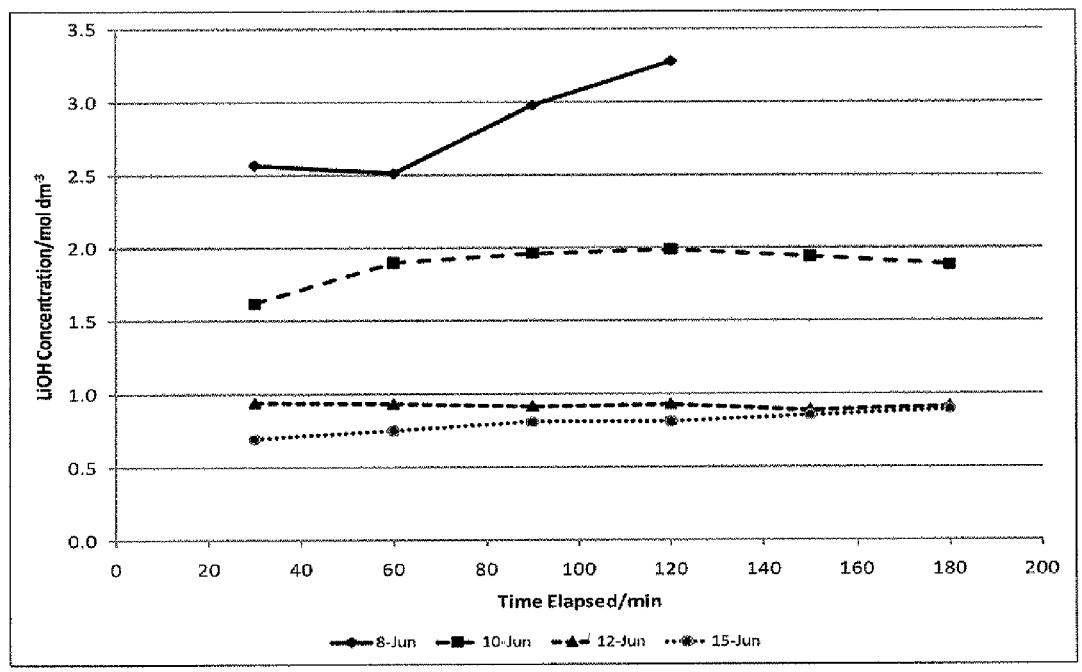
FIG. 6 shows the compares of lithium hydroxide concentration for multiple embodiments of the present invention.

The results of the concentration of the catholyte are summarized in Table 2 and are shown in FIGS. 6 to 9. FIG. 6 demonstrates the difficulty in maintaining a constant lithium hydroxide concentration based solely by adjusting the rate of water addition, in the absence of real-time measurements of the hydroxide concentration, because water can be consumed or added to the catholyte by a variety of mechanisms, including electrolysis, evaporation, and migration across the membrane with lithium cations. In general, the data suggest that the higher the initial concentration of lithium hydroxide, the more difficult the task of maintaining the concentration constant through water addition.

Figure 7:
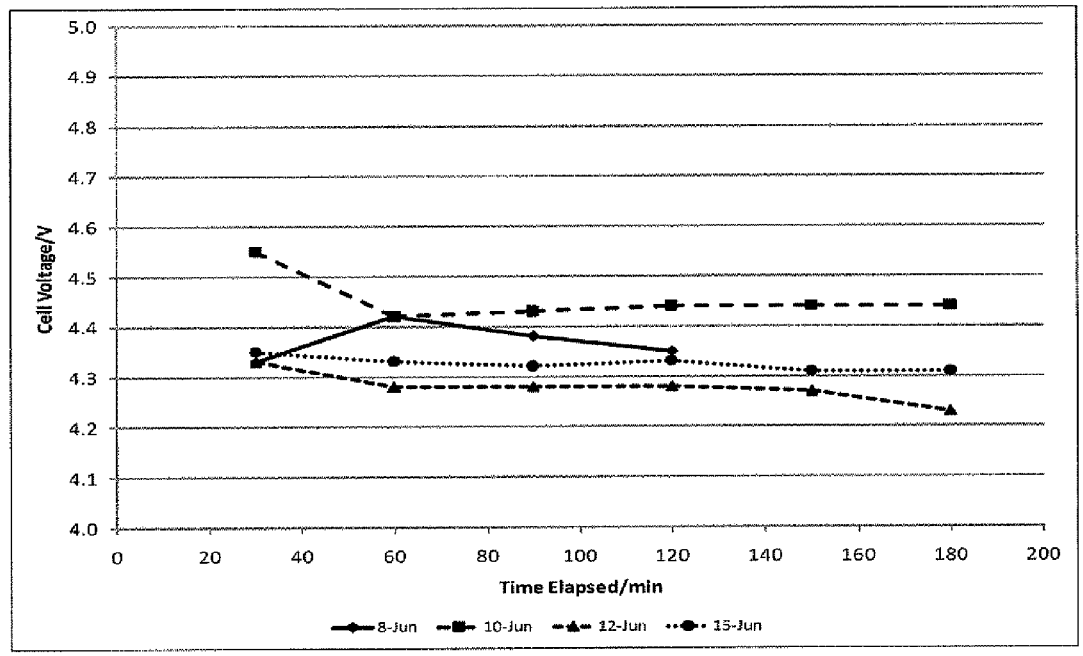
FIG. 7 shows variation of cell voltage of an electrolysis cell during preparation of lithium hydroxide in one embodiment of the present invention.

The cell voltage was maintained at approximately 4.3-4.4 V for all of the experimental runs. FIG. 7 shows that cell voltage is relatively independent of hydroxide concentration, and implies that energy consumption is largely driven by the electrical efficiency of the electrode and membrane reactions. The cell gap in the FM01 electrolyzes used in this experiment (12-13 mm) is large compared to the cell gap typically employed in commercial cells (2-3 mm), so a commercial cell would be expected to have a lower cell voltage than those measured here.

Figure 8:
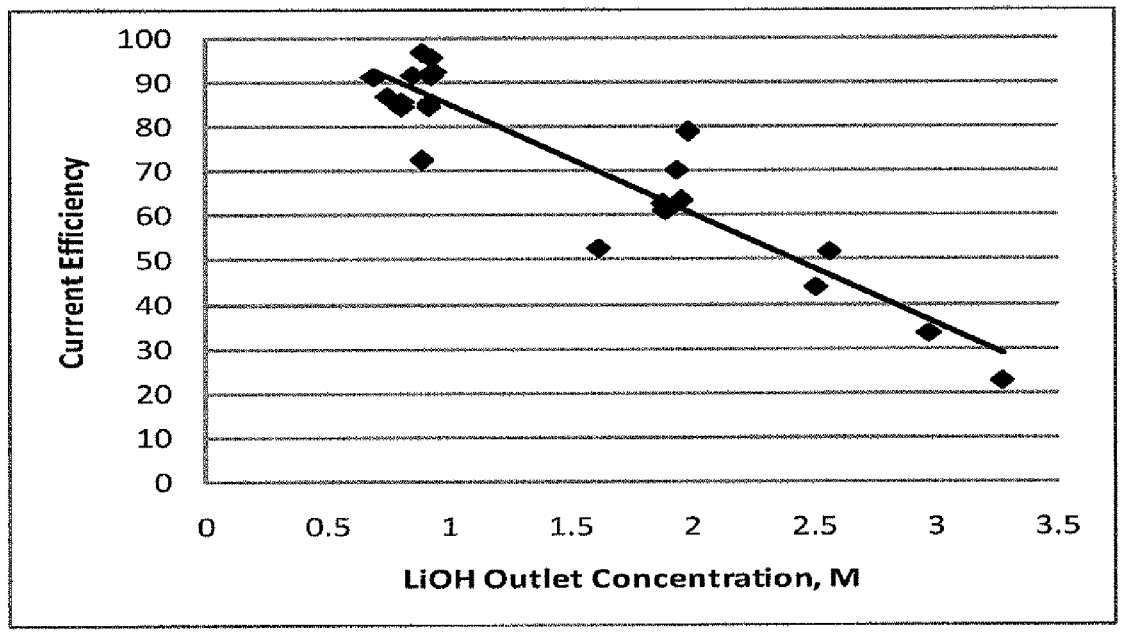
FIG. 8 shows lithium hydroxide concentration as a function of current efficiency in one embodiment of the present invention.
Figure 9:
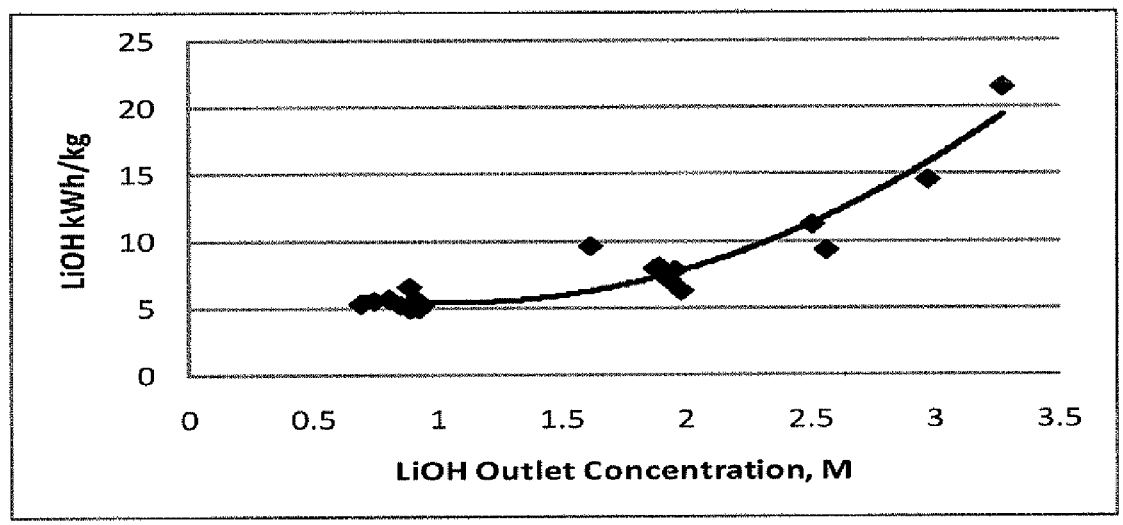
FIG. 9 shows energy consumption for production of lithium hydroxide in one embodiment of the present invention.

FIG. 8 shows that current efficiency decreases with increasing lithium hydroxide concentration. Without wishing to be bound by any one theory, it is believed this decrease in current efficiency may be due to increased back-migration of hydroxide anions across the membrane from the catholyte to anolyte as the lithium hydroxide concentration increases. As shown in FIG. 9, this also results in increased energy consumption, because all experiments were performed at the same current density and the cell voltage was essentially constant. The experiments suggest that a preferred concentration of lithium hydroxide in the electrochemical cell may be between about 1-2 molar.

Table 2 summarizes the test results. As shown, lithium hydroxide production efficiency increases as lithium hydroxide concentration decreases, having an efficiency of up to about 80-88% for lithium hydroxide solutions having a concentration of about 1 molar (2.4% by weight), Cell voltage is relatively independent of lithium hydroxide concentration, so the efficiency also drives the energy requirement, which decreases to about 5 kWh/kg lithium hydroxide produced at a concentration of about 1 molar. Lithium hydroxide production rate is greatest with lower initial concentrations of lithium hydroxide.

TABLE 2

Summary of Results.

| Test | LiOH conc. (Start) M | LiOH conc. (Final) M | Cell Voltage V | Water Added g/min | Efficiency % | Production Rate* kg LiOH/ m$^2$/hr | Energy kWh/kg LiOH |
|---|---|---|---|---|---|---|---|
| 1 | 2.57 | 3.28 | 4.37 | 0.5 | 35 | 0.94 | 15 |
| 2 | 1.62 | 1.88 | 4.45 | 5 | 65 | 1.74 | 8 |
| 3 | 0.94 | 0.92 | 4.28 | 11 | 80 | 2.14 | 5 |
| 4 | 0.69 | 0.89 | 4.33 | 10 | 88 | 2.36 | 5.3 |

*Calculated (Production rate = 2.68 kg LiOH/m$^2$/hr × efficiency).

Example 4

Carbonation

Chemical Reactor. Lithium hydroxide was carbonated using a 3 L Syrris automated batch reactor system (Syrris Ltd. 27 Jarman Way, UK), having controls for sensing pH, temperature, reagent addition, and sample extraction. The electrolytic studies detailed above suggest that Electrolysis of lithium chloride could at most generate 1 molar or 2.4 wt % lithium hydroxide solution. Indeed, this concentration has been found to be ideal for conducting carbonation studies without clogging issues under our experimental conditions.

Carbonation Reaction Kinetics. The carbonation reaction kinetics of lithium hydroxide were determined by monitoring pH and metal ion concentration in solution (using Atomic Absorption) as the reaction progressed. Approximately 84 g of lithium hydroxide monohydrate was dissolved in 2000 mL of water to prepare a solution having a concentration of about 1 molar (about 2.4% by weight). The reactor jacket was heated using a 30:70 water-glycol mixture and the temperature of the lithium hydroxide solution was maintained at about 95° C. The solution was stirred at 250 RPM with a mechanical stirrer constantly during the carbonation. The carbonating gas tube was maintained at a depth of at least 6 cm in the caustic solution to begin with and the gas flow rate was continuously monitored using a flow meter (Matheson Tri-Gas, USA). As the carbonation progressed, the pH of the solution increased slightly and the completion of the reaction was determined by sudden drop in the pH of the solution, soon after the carbon dioxide flow to the reactor was stopped. The drop in pH coincides with the formation of lithium bicarbonate, which is unstable at higher temperatures. Therefore, the solution was heating/stirring of the solution was continued to decompose lithium bicarbonate that had formed into lithium carbonate. The decomposition of the lithium bicarbonate results in increased pH which stabilized over time. Lithium ion concentration was monitored during the reaction and showed that excess carbonation of the solution can lead to bicarbonate formation.

During carbonation, a slight molar excess of carbon dioxide was added to the lithium hydroxide solution to account for poor mixing of the carbon dioxide into the lithium hydroxide solution. After completion of the carbonation reaction, the solution was hot filtered because the lithium carbonate solubility in water decreases at increased temperatures. The filtered solids were first dried at about 60° C. for about 18 hours, and were then dried at about 120° C. for about 24 hrs to ensure the conversion of any residual lithium bicarbonate that may present in the solids back to lithium carbonate. The carbonation reaction was repeated several times with a 1 molar lithium hydroxide solution under slightly different experimental conditions, and both with and without lithium carbonate seeds. The results are shown in Table 3. Seeding of lithium hydroxide solution with lithium carbonate crystals improved yields. At higher carbon dioxide flow rates (e.g., at 3 L/min and greater), the yield of the carbonation reaction remained high. As shown in Table 3, carbon dioxide feed was maintained at about 2 L/min, although the total amount of carbon dioxide added varied between about 1.25 and 2.5 moles (i.e., between about 0.625 and 1.25 molar equivalents). Experiment 1 in Table 3 included the addition of nitrogen gas to the carbonation vessel. Experiments 3-5 in Table 3 included the addition of between about 0.6% and 1.2% by weight lithium hydroxide seeds. The results show that increased reaction rate can allow for a reduction in the reactor size, and reduced overall cost associated therewith.

TABLE 3

Carbonation Reaction of a 2.4% by Weight Solution of LiOH†

| Exp. | Reaction Conditions | Overall Carbonation Yield (%)# | Lithium Carbonate Solids Recovered (%) |
|---|---|---|---|
| 1 | $CO_2$ (2 LPM, 2.5 moles) + $N_2$ (3.7 LPM) | 100.0% | 57%* |
| 2 | $CO_2$ (2 LPM, 1.9 moles) | 93% | 73% |
| 3 | $CO_2$ (2 LPM, 1.5 moles) + 1.2% $Li_2CO_3$ seeds | 99% | 82% |
| 4 | $CO_2$ (2 LPM, 1.25 moles) + 0.6% $Li_2CO_3$ seeds | 93% | 78% |
| 5 | $CO_2$ (3 LPM, 1.3 moles) + 1.2% $Li_2CO_3$ seeds | 96% | 82% |

†Prepared by mixing 84 g lithium hydroxide (LiOH•$H_2$O) in 2 L water.
Overall yield includes the amount of lithium carbonate/bicarbonate dissolved in solution and deposited inside the reactor walls.
*excessively carbonated and filtered without converting $LiHCO_3$ back into $Li_2CO_3$.

The methods described herein are suitable for the recovery of lithium from brines or solutions having low or high lithium concentrations, in addition to brines or solutions that include significant concentrations of other ions, including multivalent ions.

As is understood in the art, not all equipment or apparatuses are shown in the figures. For example, one of skill in the art would recognize that various holding tanks and/or pumps may be employed in the present method.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

I claim:

1. A method for the preparation of lithium carbonate from a brine solution containing lithium and silica, the method comprising the steps of:
    supplying a brine solution containing lithium and silica to a silica management step to remove silica and to produce a silica-lean lithium containing solution;
    supplying the silica-lean lithium containing solution to one or more lithium absorbents operable to capture the lithium from the silica-lean lithium containing solution;
    recovering the lithium from the one or more lithium absorbents to produce a lithium-rich stream;
    supplying the lithium-rich stream to an electrochemical cell to produce a lithium hydroxide-rich solution; and
    contacting said lithium hydroxide-rich solution with carbon dioxide to produce lithium carbonate.

2. The method of claim 1, further comprising concentrating the lithium-rich stream prior to supplying the lithium-rich stream to the electrochemical cell.

3. The method of claim 2, wherein the brine solution containing lithium and silica is a geothermal brine.

4. The method of claim 2, wherein the brine solution containing lithium and silica is a Salton Sea geothermal brine.

5. The method of claim 2, wherein the one or more lithium absorbents comprise one or more intercalated lithium absorbents.

6. The method of claim 5, wherein the one or more intercalated lithium absorbents are lithium aluminate intercalates.

* * * * *